United States Patent
Umay et al.

(10) Patent No.: US 11,768,849 B2
(45) Date of Patent: Sep. 26, 2023

(54) EXTENSIBLE DATA PLATFORM WITH DATABASE DOMAIN EXTENSIONS

(71) Applicant: Microsoft Technology Licensing, LLC, Redmond, WA (US)

(72) Inventors: Mehmet Kadri Umay, Redmond, WA (US); Imran Siddique, Bellevue, WA (US); Nayana Singh Patel, Mercer Island, WA (US); Jyothsna Devi Bijjam, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 66 days.

(21) Appl. No.: 17/351,969

(22) Filed: Jun. 18, 2021

(65) Prior Publication Data
US 2022/0292106 A1 Sep. 15, 2022

Related U.S. Application Data

(60) Provisional application No. 63/161,289, filed on Mar. 15, 2021.

(51) Int. Cl.
*G06F 16/25* (2019.01)
*G06F 16/23* (2019.01)
(Continued)

(52) U.S. Cl.
CPC .......... *G06F 16/258* (2019.01); *G06F 16/164* (2019.01); *G06F 16/196* (2019.01);
(Continued)

(58) Field of Classification Search
CPC .... G06F 16/258; G06F 16/164; G06F 16/196; G06F 16/211; G06F 16/2365; G06F 16/2379; G06F 16/1794; G06F 16/25
See application file for complete search history.

(56) References Cited

U.S. PATENT DOCUMENTS

| | | | |
|---|---|---|---|
| 6,701,383 B1 * | 3/2004 | Wason | H04N 21/6125 717/121 |
| 2015/0026114 A1 * | 1/2015 | Triff | G06F 16/254 707/602 |

(Continued)

OTHER PUBLICATIONS

"International Search Report and Written Opinion Issued in PCT Application No. PCT/US22/017791", dated Jul. 28, 2022, 19 Pages.
(Continued)

*Primary Examiner* — Alford W Kindred
*Assistant Examiner* — Cecile H Vo
(74) *Attorney, Agent, or Firm* — Alleman Hall Creasman & Tuttle LLP

(57) ABSTRACT

A computing system that includes one or more server computing devices including one or more processors configured to execute instructions for a domain extensibility module that provides software development tools for building domain extensions for a database platform, and a data ingestion module that provides software development tools for defining a metadata schema for extracting metadata from data files. The one or more processors are configured to receive a set of data from a user computing device, define a target metadata schema that includes one or more metadata fields that will be populated during a data ingestion process, define a target domain extension that defines one or more data types for storing the received set of data after performing the data ingestion process, and ingest the received set of data using a metadata extraction pipeline to generate metadata files based on the target metadata schema.

20 Claims, 8 Drawing Sheets

(51) Int. Cl.
*G06F 16/16* (2019.01)
*G06F 16/21* (2019.01)
*G06F 16/188* (2019.01)

(52) U.S. Cl.
CPC ........ *G06F 16/211* (2019.01); *G06F 16/2365* (2019.01); *G06F 16/2379* (2019.01)

(56) References Cited

U.S. PATENT DOCUMENTS

2015/0186808 A1* 7/2015 Petitclerc ........... G06Q 10/0637
                                                          705/348
2017/0177390 A1* 6/2017 Diebner .................. G06F 9/541
2021/0398235 A1* 12/2021 Dixit ..................... G06F 16/254

OTHER PUBLICATIONS

"Product Documentation—InterBase 2020—Update 1—Data Definition Guide", Retrieved From: https://docwiki.embarcadero.com/images/InterBase/2020/e/d/d3/DataDef.pdf, May 2020, 219 Pages.
"Invitation to Pay Additional Fees Issued in PCT Application No. PCT/US22/017791", dated Jun. 7, 2022, 15 Pages.

* cited by examiner

EXTENSIBLE DATA PLATFORM WITH DATABASE DOMAIN EXTENSIONS

CROSS REFERENCE TO RELATED APPLICATIONS

This application claims priority to U.S. Provisional Patent Application Ser. No. 63/161,289, filed Mar. 15, 2021, the entirety of which is hereby incorporated herein by reference for all purposes.

BACKGROUND

The energy industry is rapidly moving to reduce greenhouse gas (GHG) emissions and transition to a GHG neutral future. Data driven regulation and auditing, as well as end-to-end business optimization needs have pushed businesses operating the in the energy industry toward cloud-based data storage and processing. However, many businesses operate across a variety of domains in the energy industry, such as exploration, drilling, and production. Each of these domains may have different types of data, different workflows for handling that data, and other requirements that have led to separate data platforms being built for each of those domains. Integration of these different data platforms is a challenging task for these businesses.

SUMMARY

A computing system is provided. The computing system may include one or more server computing devices including one or more processors configured to execute instructions for a domain extensibility module that provides software development tools for building domain extensions for a database platform of the computing system. The domain extensions may define a data type for data to be stored on the database platform, and storage and infrastructure components for the database platform for storing that defined data type. The one or more processors may be configured to execute instructions for a data ingestion module that provides software development tools for defining a metadata schema for extracting metadata from data files stored on the database platform, and generating a metadata extraction pipeline to extract metadata based on the defined metadata schema. The one or more processors may be configured to receive a set of data from a user computing device, define a target metadata schema that includes one or more metadata fields that will be populated during a data ingestion process, define a target domain extension that defines one or more data types for storing the received set of data after performing the data ingestion process, ingest the received set of data using a metadata extraction pipeline to generate metadata files based on the target metadata schema, store the ingested set of data and the generated metadata files based on the target domain extension, and provide a network accessible endpoint for accessing the ingested set of data and the metadata file.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Data platforms for oil, gas, subsurface data, clean energy, and other related spaces are typically built and optimized for specific domains such as exploration, drilling, and production. Each of these domains may have different types of data, different workflows for handling that data, and other requirements that have led to separate data platforms being built for each of those domains. The data types for specific domains, and the interactions and connectivity between applications that process the data within those specific domains are typically hardcoded on these different platforms. Additional hardcoded functionality and domain specific applications causes these data platforms to be siloed.

Data driven regulation and auditing, as well as end-to-end business optimization needs have pushed businesses operating the in the energy industry toward integration of their data platforms across the different domains. However, integration of these different data platforms is a challenging task for these organizations. Building a data platform that hosts all of the organizations' data may be challenging due to needs to optimally host thousands of data types with differing business and physical characteristics along with providing connectivity to thousands of legacy and cloud native applications.

Figure 1:
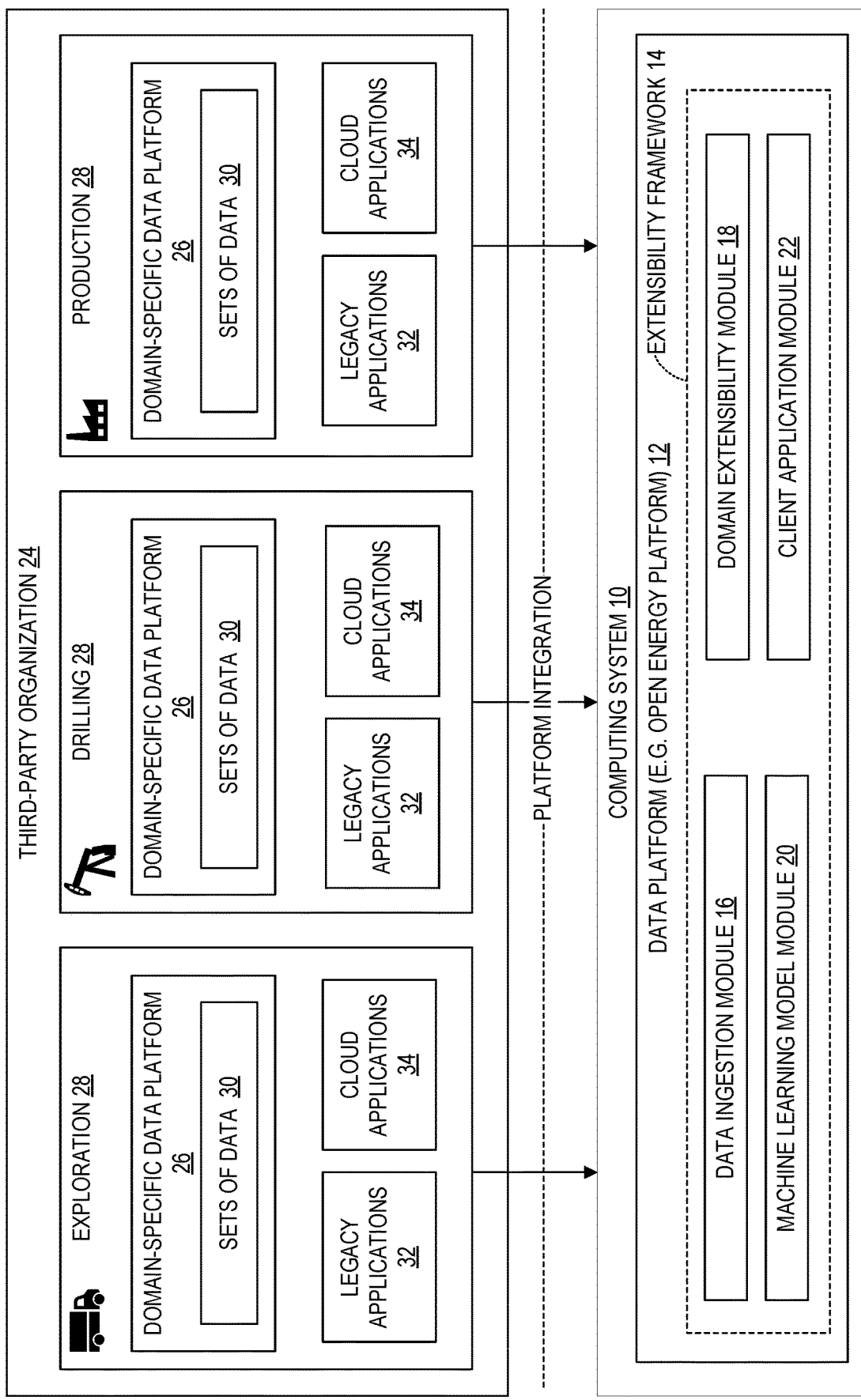
FIG. 1 shows an example computing system for a data platform that includes an extensible framework for database domain extensions to provide systems for integrating domain-specific data platforms for third-party organizations, according to one embodiment of the subject disclosure.

To address these issues, FIG. 1 illustrates a computing system 10 that includes a data platform 12 may, in some examples, be referred to herein as an open energy platform.

However, it should be appreciated that the data platform 12 may also be used in other contexts outside of the energy industry. The data platform 12 is built with an extensibility framework 14 that includes extensible functionality at several different layers. For example, the extensibility framework 14 may include extensible functionality for a data ingestion module 16, a domain extensibility module 18, a machine learning model module 20, and a client application module 22. In one example, the data platform 12 implements software development kits (SDK) to provide training and services/tools to simplify the building of these extensible components and functionality.

Using the extensibility framework 14 of the data platform 12, a third-party organization 24 may integrate the data and functionality of various domain-specific platforms 26 used by the third-party organization. These domain-specific data platforms 26 may have been hardcoded to handle data and applications for a particular domain. FIG. 1 illustrates several example domains 28 such as exploration, drilling, and production. However, it should be appreciated that these domains 28 are merely exemplary, and that there are a multitude of potential domains that may each have separate siloed domain-specific data platforms 26. Each domain-specific data platform 26 may include hard coded functionality for collecting, storing, and processing sets of data 30 for that domain 28. Further, each domain-specific data platform 26 may be developed to interact with legacy applications 32 that may be unaware of cloud-based technology, as well as cloud-aware applications 34. As discussed above, the connectivity between the domain-specific data platforms 26 and those legacy applications 32 and cloud applications 34 are typically hardcoded. Thus, the data platforms and applications for each domain 28 operated by the third-party organization 24 may potentially be siloed from each other, causing integration across these domains 28 to be challenging.

The data platform 12 of the computing system 10 provides functionality for extending the data ingestion module 16 and the domain extensibility module 18 to ingest and store the sets of data 30 from each domain 28. The data platform 12 also provides functionality for enabling connectivity between the data platform 12 and the legacy applications 32 and cloud applications 34 using a file system mounting process.

Figure 2:
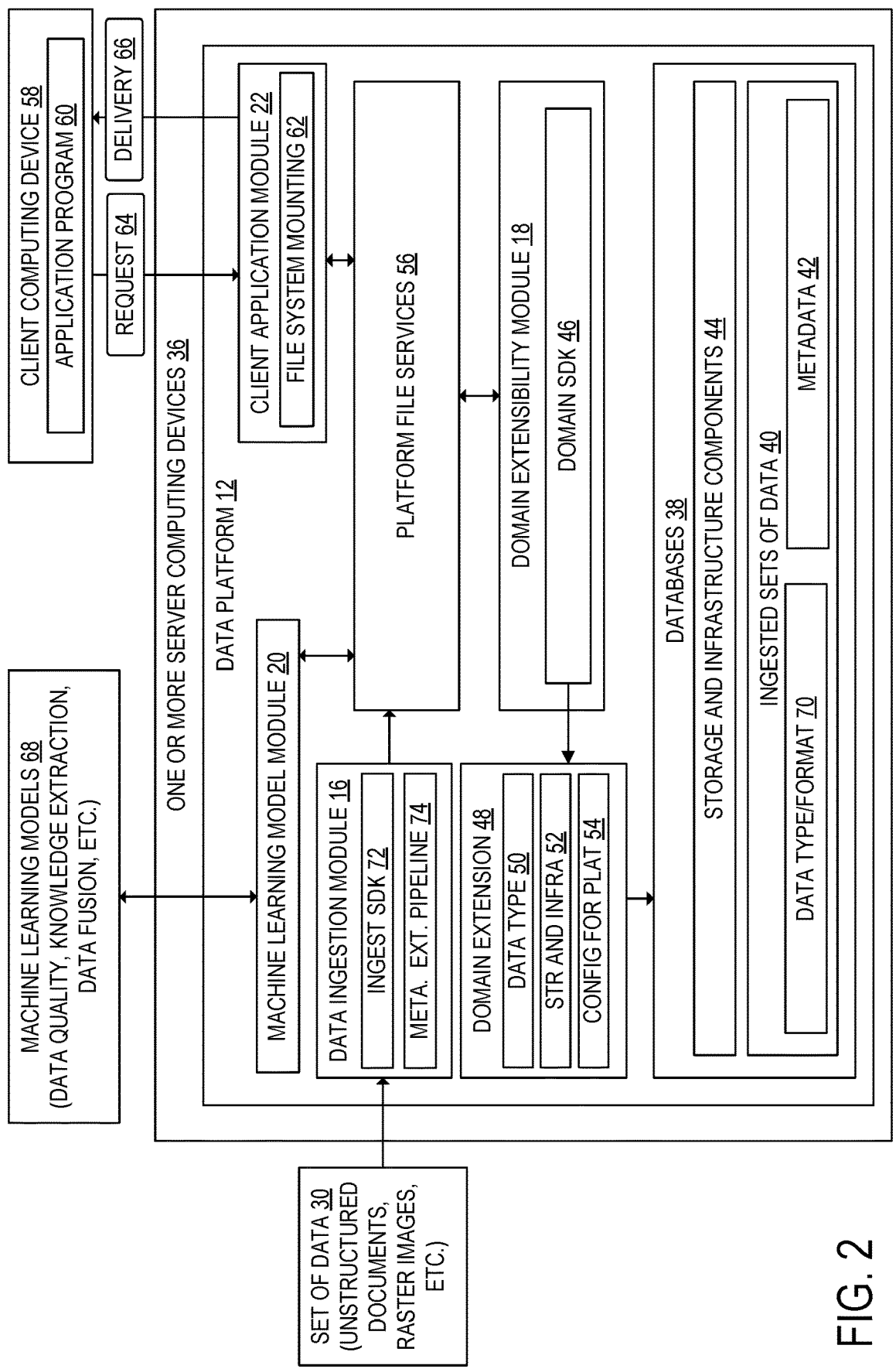
FIG. 2 shows a schematic view of a data platform that includes several extensible modules that provide software development tools for customizing the ingestion and storage of sets of data, implemented by the computing system of FIG. 1.

FIG. 2 illustrates an example of the computing system 10. As shown, the computing system 10 comprises one or more server computing devices 36. In one example, the computing system 10 may include a plurality of server computing devices 26 configured to operate in a cloud computing configuration to perform the functions of the data platform 12. The one or more server computing devices 36 include processors, volatile and non-volatile storage, networking components, and other computing components. The one or more server computing devices 36 are configured to execute instructions for the data ingestion module 16, the domain extensibility module 18, the machine learning model module 20, and the client application module 22. The data platform 12 includes one or more databases 38 that store sets of data 40 ingested by the data ingestion module 16. The one or more databases 38 may also store metadata 42 that is extracted from the sets of data 40 during the ingestion process. The one or more databases 38 may include a variety of storage and infrastructure components 44 for different types of storage software, protocols, and configurations.

For example, the databases 38 may include separate storage locations that are specialized for different types of data and storage protocols. As a specific example, the databases 38 may include storage and infrastructure components 44 for a relational database used to store relational data, such as a Structured Query Language (SQL) database. As another example, the databases 38 may include storage and infrastructure components 44 for a Binary Large Object (BLOB) database that may be used to store large chunks of data. As another example, the databases 38 may include storage an infrastructure component for hierarchical data formats such as HDF5, which is useful for storage of complex and voluminous data sets. As another example, the databases 38 may include storage and infrastructure components optimized for storing time-series data. The storage and infrastructure components 44 of the databases 38 are extensible, such that new types of protocols, software, and configurations may be added to the databases 38 to store other types of data. It should be appreciated that the databases 38 may be extended to operate with any suitable type of database management system. As a few other non-limiting examples, the databases 38 may be extended to include hierarchical databases, network databases, object-oriented databased, graph databases, document databases, etc.

The domain extensibility module 18 includes a software development kit (SDK) that provides a collection of software development tools for building domain extensions for a database platform 12. These software development tools may be provided to the third-party organizations 24 to enable those organizations to extend the functionality of the data platform 12 to suit their needs and requirements. In one example, the software development tools of the SDK 46 may be used to build domain extensions 48 that define a data type 50 for data to be stored on the database platform 12. As a few specific examples, the data types 50 may include a BLOB data type, a time series data type, a relational data type, etc. However, it should be appreciated that the data platform 12 may be extended to handle any suitable data type 50. In some examples, the software development kits described herein may include tools that do not require program code input from the client to perform the described functionality.

The domain extensions 48 may further include extensible functionality for storing that particular data type 50. For example, the domain extension 48 may include storage and infrastructure components 44 that are needed to store the new data type 50. The storage and infrastructure components 52 may, for example, include software for a corresponding database management system, a configuration for the database 38, etc. The domain extensions 48 built using the SDK 46 of the domain extensibility module 18 may also include new functionality for the data platform 12. For example, the domain extensions 48 may further include a configuration 54 for the data platform 12 when deployed, boilerplate code, document schemas, and tools for handing workflow. For example, the domain extensions 48 may be built for a third party to define how the third party's BLOB data will be chunked, compressed, and stored in the database 38. As another example, the domain extensions 48 may define how time sequential files will be stored in a time series on the database 38. As yet another example, the domain extensions 48 may define how a third party's relational data will be stored within a relational database. In this manner, the domain extensions 48 may be built to define how the third-party organization's data will be stored, and configurations for storing that data in the data platform 12.

The domain extensibility module 18 may be configured to operate with a platform file services program 56 of the data platform 12. The platform file services 56 may handle data routing and exchange on the data platform 12. For example, the platform file services 56 may handle requests to store or retrieve data for the databases 38 of the data platform 12. Using the domain extensibility module 18, a configuration for storing and accessing data using the platform file services 56 may be specified. For example, the domain extensions 48 may specify a process for providing network accessible endpoints for accessing data stored on the database platform 12 to authorized users of the third-party organization. In one example, these network accessible endpoints may be provided to client computing devices 58 that are authorized to access the data.

The platform file services 56 may also operate in conjunction with the client application module 22 to exchange data with application programs 60 executed by the client computing devices 58 over a computer network. The client application module 22 may provide software development tools for integrating other application programs 60 executed on client computing devices 58 with the computing system 10. Using these software development tools, extensible functionality of the client application module 22 may be built to provide integration with the application programs 60, which may include legacy applications 32 that may not be cloud-aware and cloud-aware applications 34. For example, functionality of the client application module 22 may be extended to communicate with the application programs 60 executed by the client computing device 58 using any suitable protocols such as Hypertext Transfer Protocol (HTTP), Energetics Transfer Protocol (ETP), etc. Using the software development tools, a developer may specify how protocols and other interaction/connectivity processes between the application programs 60 and the data platform 12.

Legacy applications 32 that are not cloud-aware may potentially not include functionality for accessing data from a cloud-based system. Rather, these legacy applications 32 may read/write to a specific file system and/or directory on a local storage volume, and would not be able to read/write to a cloud-based network accessible endpoint. That is, a legacy application 32 may only be able to see files in a specific type of file system such as Server Message Block (SMB), Network Time Protocol (NTP), etc. In this example, the client application module 22 may be extended to include file system mounting 62 functionalities for a specific legacy application 32 executed on the client computing device 58. The software development tools of the client application module 22 may provide mounting options for mounting data stored in the database 38 for those file systems. In some examples, the client application module 22 may provide a virtual drive with specific file paths for the legacy application 32 to read/write. In this manner, the client application module 22 may mount data to different file systems and utilize different file formats for the legacy application.

In one example, the software development tools of the client application module 22 may include settings for the file system mounting 62 specifying a target file system for each application program 60 that requires that functionality. The client application module 22 may automatically perform file system mounting 62 according to these settings for application programs 60 requesting access to data on the data platform 12. In another example, the target file system for the file system mounting 62 may be specified in a request 64, which may be a search request or a request for a specific set of data stored on the data platform 12, or another type of application request.

The client application module 22 may be configured to receive the requests 64 from the integrated application program 60 to retrieve target data stored on the database platform 12. In one example, the requests 64 may include the target file system for receiving the target data specified by the client application. In another example, the target file system may be specified by an authorized user of the client application using software development tools provided by the client application module 22. The client application module 22 may retrieve the target data from the database platform 12 using the platform file services 56, which consults an internal mapping to determine a location of the target data in the databases 38.

The file system mounting 62 process of the client application module 22 may be configured to emulate a file architecture of the target file system at the network accessible endpoint. The emulated file architecture may, for example, include a target file path that is expected by the client application program 60 run on the client computing device 58. For example, the client application program 60 may have been hard coded to read and write to a file with the name "Oil.data", located at the target file path "F:\Documents\TankData\Oil.data". The file system mounting 62 may be configured to retrieve the target data from the database platform 12, and place the target data in a file named "Oil.data" at the network accessible endpoint with the emulated file architecture and the specified file path expected by the client application program 60. In this manner, the client application program 60 may be directed to read and write to the file on the network accessible endpoint without requiring changes in the source code of the legacy application. The file architecture, file path, file name, and other emulations needed to integrate with these legacy applications may be specified using the software development tools of the client application module 22.

The integrated application programs 60 may send search requests for data, and receive the corresponding data from the client application module 22 using the network accessible endpoint in a manner suitable for that specific integrated application program 60. Cloud-aware application programs may potentially not require file system mounting 62, and may instead access the target data via cloud-based protocols. In this manner, the computing system 10 may be extended to integrate with any suitable legacy application and cloud-ware application that may have already been developed by the third-party organization 24.

In one example, the requests 64 may take the form of search requests that include a search parameter for the target data. For example, the requests 64 may include a search parameter of "Oil tank data from December". The client application module 22 and the platform file services 56 may coordinate to search the databases 38 of the computing system 10 to search the stored sets of data and stored metadata files associated with those stored sets of data based on the search parameter to identify the target data. The identified target data may then be provided to the requesting application as described herein.

The machine learning model module 20 handles integration with machine learning models 68, which may include models executed by the data platform 12 and models executed on other computing devices, such as, for example, the client computing device 58. The machine learning models 68 may include a plurality of different types of machine learning models that may perform different types of data processing. For example, the machine learning models 68 may include models that perform data quality verification, models that perform knowledge extraction, models for data fusion, etc. The machine learning model module 20 may provide software development tools for building the services and toolset to enable the extraction of metadata 42 for the ingested sets of data 40. For example, the machine learning model module 20 may enable the processing of ingested data to extract three-dimensional volumes, documents, non-structured data such as raster images, etc. The machine learning model module 20 may also enable the running of cognitive services such as Knowledge Management, the creation of new and enriched schema, and the data population of those new schemas that may be stored on the data platform 12 along with the corresponding ingested set of data 30.

Typically, application programs running these machine learning models 68 are already cloud-aware, and include functions for integrating with cloud-based platforms such as the Open Energy Platform of the computing system 10. In these examples, the machine learning model module 20 may be configured to integrate with these machine learning models 68 using the existing cloud-aware functions of those applications. As a specific example, the machine learning model module 20 may be configured to provide tensor flow libraries populated with data stored in the databases 38 to the machine learning models 68. As another example, the machine learning model module 20 may provide tools for a computational notebook that authorized users may use to combine software code, computational output, explanatory text, multimedia resources for interacting with the machine learning models. However, it should be appreciated that other types of machine learning models 68 may be configured to interact with data using other techniques.

The machine learning model module 20 is also configured to integrate the machine learning models 68 into the workflows and pipelines generated by the data ingestion module 16. The machine learning model module 20 may include software development tools for building the cognitive services that may be used by the data ingestion module 16.

The data ingestion module 16 handle batch ingestion of sets of data 30 received from a user computing device or other computing devices, such as, for example, the sets of data stored on the domain-specific data platforms 26 of the third-party organization 24. The received sets of data 30 or reference files for the received sets of data 30 may be uploaded and initially managed by the platform file services 56. The data ingestion module 16 may then be configured to classify the set of data 30 to determine a data type 70 for the set of data 30. The data platform 12 may include a plurality of data types 70 that may be used to classify the set of data 30. These data types 70 may, for example, include popular data types such as PDFs, TXT, DOC, XLS, etc. The data types 70 known the data platform 12 may also include data types 70 included in the Open Subsurface Data Universe (OSDU) standards. For example, the data types 70 may include a seismic data type. It should be appreciated that these data types 70 are merely exemplary, and that the data platform 70 may include any suitable data type 70 for classifying the sets of data 30. Further, it should be appreciated that the list of data types 70 known to the data platform 70 may be extended via the domain extensions 48 built using software development tools provided by the domain extensibility module 18.

The data ingestion module 16 may include an ingest SDK 72 that provides software development tools for building a metadata extraction pipeline 74 to ingest the stored set of data 30 and extract target types of metadata 42. The extracted metadata 42 may be associated with the stored set of data 30 on the database platform 12. The metadata 42 may improve the searchability of the data stored in the databases 38. Further, the metadata 42 may provide enriched schemas that provide additional data for the application programs 60 run by client computing devices 58.

After the set of data 30 has been uploaded to the data platform 12, the ingest SDK 72 provides tools to extract the specific formats and data types of the uploaded set of data 30. The ingest SDK 72 may also provide tools for identifying what types of metadata 42 can be extracted from the set of data 30 using the machine learning models 68 known to the data platform 12, or provided by the user. The ingest SDK 72 may also provide tools for identifying what schemas the set of data 30 may fit into, and may also provide tooling/guidance for developing or integrating the application programs 60 with the ingested data and schemas.

The ingest SDK 72 may build the metadata extraction pipeline 74 to extract different levels of metadata depending on the user's needs. At a basic level, the metadata extraction pipeline 74 may include parser programs to extract an author of each file in the set of data, file types, times/dates for file creation and modification, etc. The basic metadata can typically be extracted from the file properties of the set of data 30, depending upon the file types. The metadata extraction pipeline 74 may also include a deep machine learning parser program that extracts data such as text, images, tables, etc., from the sets of data 30 that may be included in the content of the file rather than the file properties.

The metadata extraction pipeline 74 may also include more sophisticated cognitive services. For example, the metadata extraction pipeline 74 may be built to include machine learning models 68 that can process the files of the set of data 30 to extract metadata such as entity names, geolocation data, titles, form headers, etc. These machine learning models 68 may also, for example, generate summaries of the content in the file.

In one example, the metadata extraction pipeline 74 may be built to include machine learning models 68 run by a third-party such as the third-party organization 24 or another organization. For example, software development tools provided by the machine learning model module 20 may be used to add new machine learning models 68 to the data platform 12, and the software development tools provided by the data ingestion module 16 may be used to add those new machine learning models 68 to the metadata extraction pipeline 74. In this manner, the data ingestion process for the data platform 12 is extensible and customizable by the user. Using these tools, the user may build a set of pipelines and filters to extract the target metadata 42 that may be valuable to that user or organization.

The platform file services 56 may be configured to store the received sets of data 30 and the extracted metadata data on the database platform 12. In some examples, the sets of data 30 may be stored in a different format than the originally received sets of data 30. As a specific example, the sets of data 30 may be received in the form of EXCEL spreadsheets generated by legacy applications. During ingestion by the data ingestion module 16, specific data from the EXCEL spreadsheets and metadata derived from the received data may be extracted and stored in a different format separate from the EXCEL spreadsheets. For example, if the sets of data 30 includes EXCEL spreadsheets that record data for each separate day, the ingested sets of data 40 may instead be stored with a data type/format 70 for time-series data, or another format. The data type/format 70 for the stored ingested sets of data 40 may be specified using the ingest SDK 72 of the data ingestion module 16. If the data platform 12 does not include a particular data type/format 70, the user may extend the data platform 12 to provide support for that particular data type/format 70 using the domain extensibility module 18. The ingested sets of data 40 may then be stored at a corresponding domain of the databases 38 that includes corresponding storage and infrastructure components 44 for storing data for the data type/format 70 specified for the ingested sets of data 40. For example, SQL data types that include numeric data type, date/time data types, character/string data types, Unicode character/string data types, binary data types, etc., may be stored in a relational database such as a SQL database that has the corresponding storage and infrastructure components 44.

Figure 3:
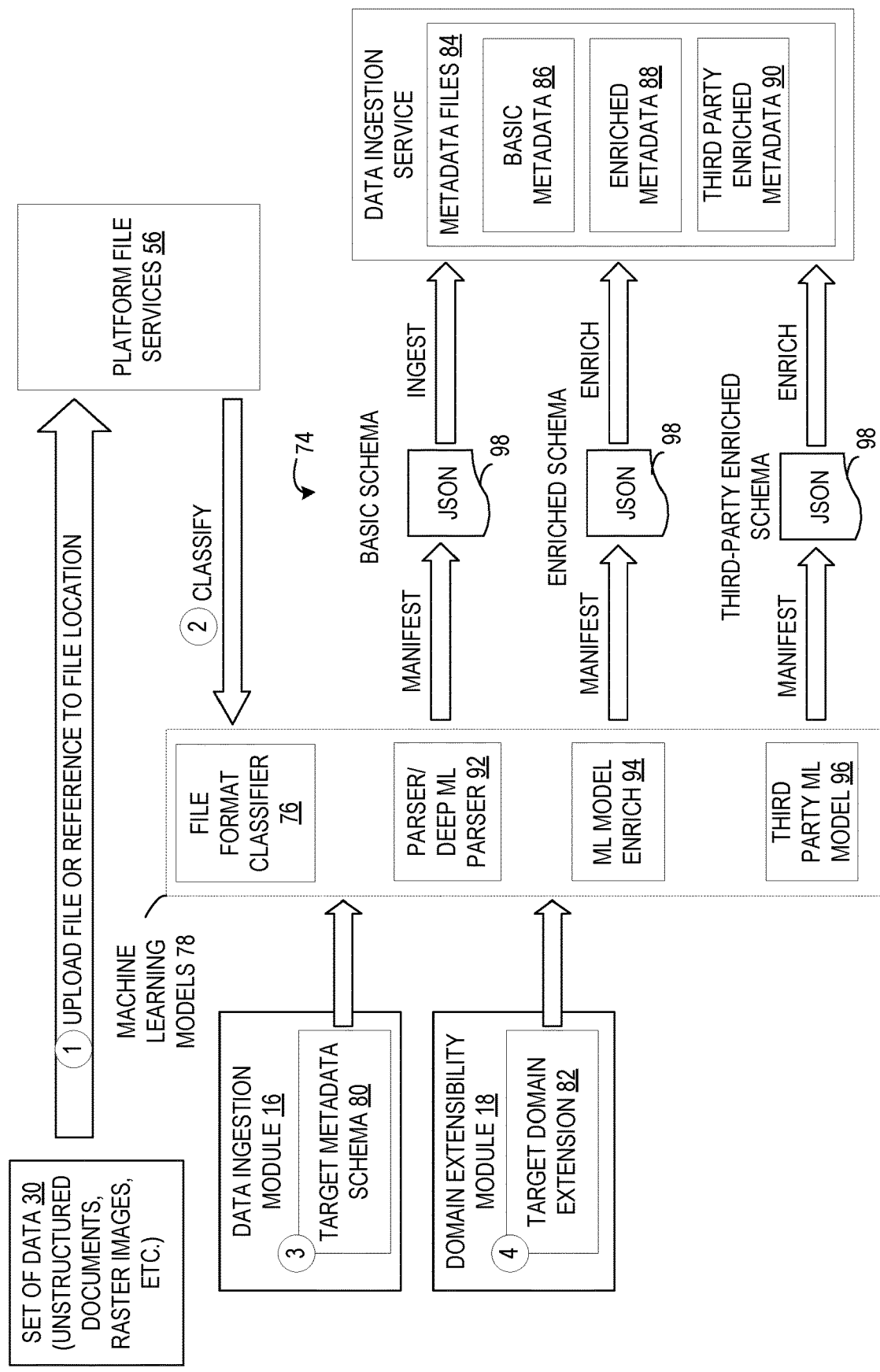
FIG. 3 shows a schematic view of a metadata extraction pipeline for ingesting data received from domain-specific data platforms for third-party organizations, implemented by the computing system of FIG. 1.

FIG. 3 illustrates an example ingestion process. At (1), the computing system 10 receives a set of data 30 from a client computing device 58, or another computing device such as one or more computing devices of the domain-specific data platforms 26 owned by the third-party organizations 24. The files or references to file locations for the sets of data 30 may be processed by the platform file services 56, which may retrieve and organize each file of the sets of data 30.

At (2), the computing system 10 uses a file format classifier 76, which may take the form of one of the machine learning models 78 executed on the computing system 10. The file format classifier 76 may be configured to analyze one or more files of the sets of data 30 to classify the received set of data 30 to determine a file format for the received set of data 30. As a specific example, the file format classifier 76 may determine that the files in the sets of data 30 are EXCEL sheet files. As another example, the file format classifier 76 may determine that the files are seismic data files. It should be appreciated that the file format classifier 76 may be configured to perform classification for any suitable type of file format.

At (3), the data ingestion module 16 of the computing system 10 may be configured to define a target metadata schema 80 that includes one or more metadata fields that will be populated during a data ingestion process. In one example, the data ingestion module 16 may be configured to programmatically define the target metadata schema 80 based on the determined file format for the received set of data 30. As a specific example, the data ingestion module 16 may programmatically define the target metadata schema 80 to be a default seismic metadata schema, such as an OSDU schema for seismic data, for files that have been classified to a seismic data file format. The data ingestion module 16 may include a mapping between different classifications of file formats and default metadata schemas known to the computing system 10. It should be appreciated that this mapping may be extensible and modifiable by an authorized user for the sets of data 30.

In another example, the target metadata schema 80 may be defined based on input from an authorized user. For example, an authorized user may upload or otherwise select a new target metadata schema, and assign the new target metadata schema to the set of data 30. The new target metadata schema may, for example, include metadata fields for particular types of data that require third-party machine learning models 78 to extract from the set of data 30, or may include metadata fields that are otherwise not included in the basic or default metadata schemas of the computing system 10.

In some examples, the databases 38 of the computing system 10 may already include suitable storage and infrastructure components 44 for storing and managing the sets of data 30 and the extracted metadata for the sets of data 30. In another example, the platform may need to be extended with new capabilities to appropriately store the sets of data 30. At (4), the domain extensibility module 18 is may be configured to define a target domain extension 82 that defines one or more data types or formats 70 for storing the received set of data 30 after performing the data ingestion process. The target domain extension 82 is a domain extension 48 managed by the domain extensibility module 18. The components of the domain extension such as the data type 50, storage and infrastructure components 52, and configuration for the platform 54, may be defined based on user input to the domain extensibility module 18. By the defining the target domain extension 82, an authorized user may, for example, configure the computing system 10 to store the sets of data 30 as a different data type and/or file format. For example, a set of Excel files that includes daily output data from a sensor could be stored as time-series data in a time-series database.

At (5), data ingestion module 16 may be configured to ingest the received set of data 30 using a metadata extraction pipeline 74 to generate metadata files 84 based on the target metadata schema 80 defined using the data ingestion module 16. FIG. 3 shows several example metadata extraction pipelines 74 for extracting different levels of metadata, such as basic metadata 86, enriched metadata 88, and third party enriched metadata 90. The basic metadata 86 may be extracted using a parser and/or a deep machine learning parser 92. The parser may be configured to extract file properties, authors, dates for when file was written, etc. These types of metadata may be useful for finding and searching for data within the databases 38. The deep machine learning parser may be configured to extract and separate text, images, tables, and other types of data within the files of the sets of data 30.

The enriched metadata 88 may be extracted using machine learning model enrichment 94. These machine learning models may be executed on the computing system 10, and may, for example, be configured to extract metadata data such as entity name, geolocation data, image data, document data, summarizations of data, titles, etc. In some examples, the user may have third party machine learning models 96 that are not included on the computing system 10. In these examples, the authorized user may integrate those third-party machine learning models 96 with the computing system 10 using the functionality of the machine learning model module 20 described above. After integrating the third-party machine learning model 96, the set of data 30 may be ingested using the third-party machine learning model 96 to extract the third party enriched metadata 90.

In these example metadata extraction pipelines 74, the data ingestion module 16 may be configured to generate manifests 98 based on the target metadata schema 80. The manifests 96 may take the form of JavaScript Object Notation (JSON) files that define how the sets of data 30 should be ingested and stored. The ingested data 40 may be stored on the databases 38, and may include portions of the data within the sets of data 30 and the metadata extracted by the metadata extraction pipeline 74. The ingested files 40 may, in some examples, have a different file format and/or data type than the original received sets of data 30.

The computing system 10 may then store the received set of data 30 and the generated metadata files 84 based on the target domain extension 82. The stored data may take the form of the ingested data 40 shown in FIG. 2. The platform file services 56 of the computing system 10 may be configured to provide a network accessible endpoint for accessing the ingests set of data 40 and the metadata file 84. The ingested set of data 40 may be indexed for search using the techniques described above. The network accessible endpoint may be provided to integrated application programs 60 run on client computing devices 58. In some examples, the ingested sets of data 40 may be mounted to different file formats and architectures as requested by different application programs 60.

Figure 4:
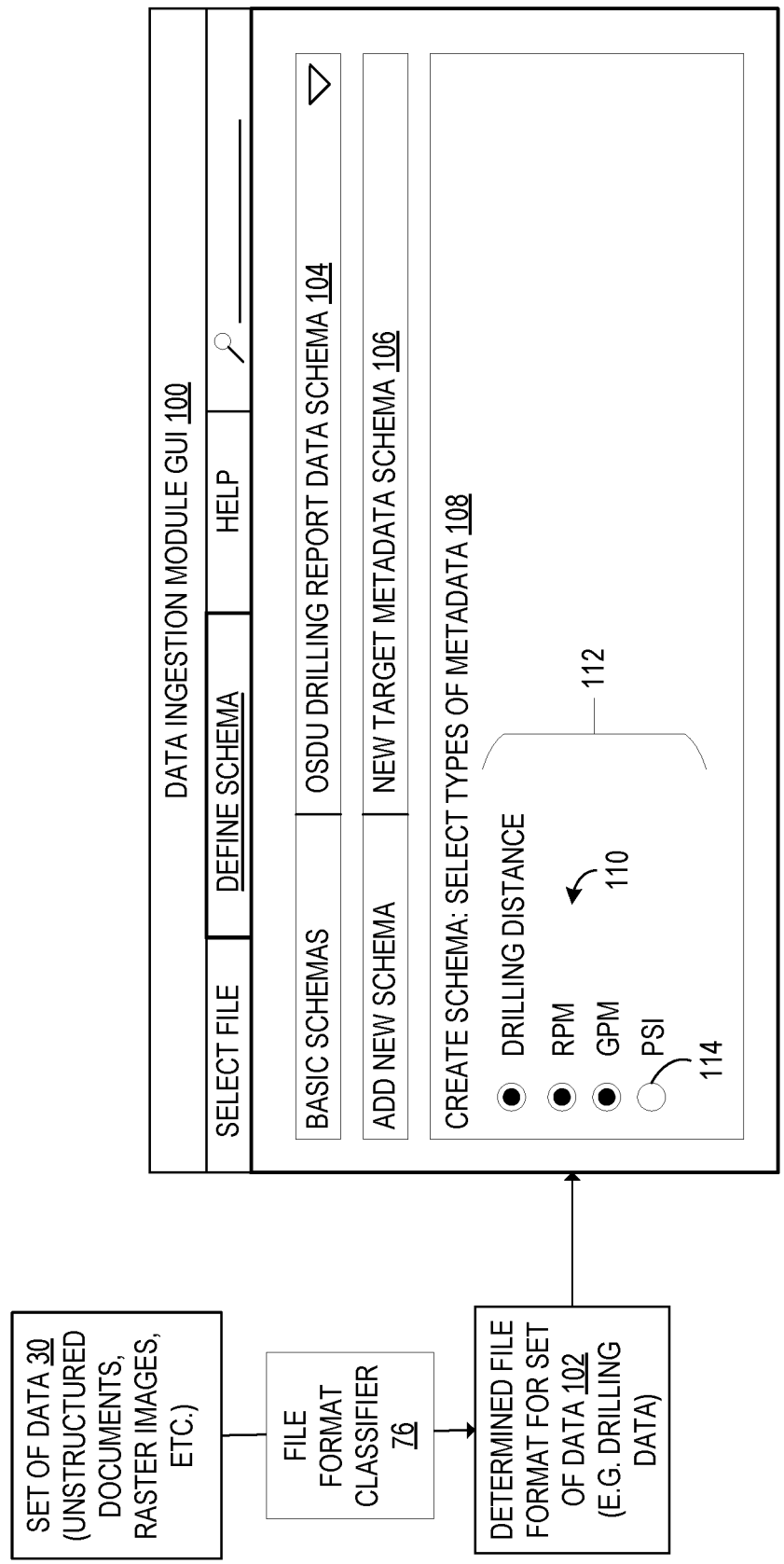
FIG. 4 shows an example graphical user interface (GUI) for defining a target metadata schema used for ingesting data received from domain-specific data platforms for third-party organizations, implemented by the computing system of FIG. 1.

FIG. 4 shows an example graphical user interface (GUI) 100 for the data ingestion module 16 for defining a target metadata schema 74. First, the file format classifier 76 is used to classify the set of data 30 to determine a file format for the set of data 30. In the specific example of FIG. 4, the set of data 30 has been classified to a file format for "drilling data". The determined file format 102 is sent to the data ingestion module 16, which is configured to define the target metadata schema 74 based on the determined file format 192 for the received set of data 30. In the example illustrated in FIG. 4, the data ingestion module 16 has defined the target metadata schema 74 to be an OSDU drilling report data schema 104. The OSDU drilling report data schema 104 may be a basic or default metadata schema that is associated with the "drilling data" file format. As another example, the data ingestion module 16 may have selected an enriched OSDU drilling report data schema that includes metadata fields for other types of enriched metadata extracted using machine learning models 78, such as summarization metadata. It should be appreciated that the OSDU drilling report data schema 104 is exemplary, and that any suitable type of metadata schema may be selected by the data ingestion module 16 for the determining file format 102 of the set of data 30.

In another example, the authorized user of the set of data 30 may specify a new metadata schema that is not included on the computing system 10. The user may enter an input to add a new schema to the data ingestion module GUI 100. In the illustrated example, the authorized user may add the new metadata schema by uploading an example file, entering a URL for accessing the new metadata schema, etc. The data ingestion module GUI 100 is configured to receive the new target metadata schema 106 from the authorized user based on the input to the data ingestion module GUI 100. The data ingestion module 16 may then be extended to include the new target metadata schema 106, such that the new target metadata schema 106 may be selected for the set of data 30.

The data ingestion module GUI 100 may also include an interface 108 for creating a target metadata schema 80. The data ingestion module 16 may be configured to identify a plurality of types of metadata 110 that can be extracted from the received set of data 30. The data ingestion module 16 may parse one or more files of the set of data 30 for titles of data fields, example data formats, etc. Additionally, the data ingestion module 16 may identify one or more types of metadata 110 based on the determined file format for the set of data 102. For example, a "drilling data" file format may typically be associated with metadata such as drilling distance and rotations per minute (RPM).

The data ingestion module GUI 100 may be configured to present a list 112 of the plurality of types of metadata 110 identified by the data ingestion module to the authorized user of the set of data 30. The data ingestion module GUI 100 may also present GUI elements 114 for receiving user input for the list 112. The data ingestion module GUI 100 may receive user input of one or more user selected types of metadata 110, such as a selection of one or more of the GUI elements 114 associated with the type of metadata 110. The data ingestion module 16 may then define the target metadata schema 80 based on the one or more user selected types of metadata. The data ingestion module 16 may be extended to include the user created metadata data schema, which may then be used for ingesting the set of data 30.

Figure 5:
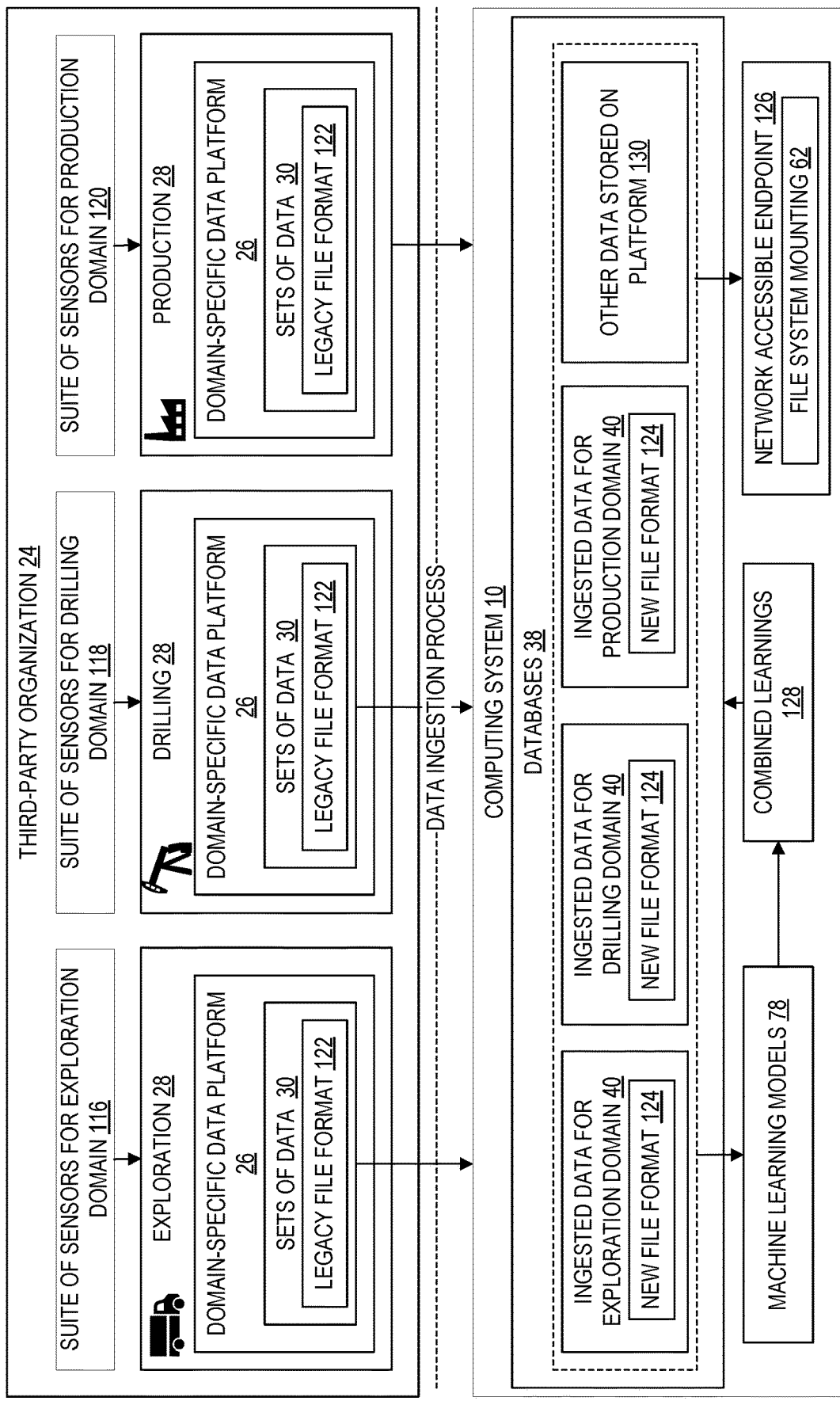
FIG. 5 shows an example of ingesting sets of data from multiple domain-specific data platforms of a third-party organization, storing the ingested data, operating on the ingested data using machine learning models, and providing access to the ingested data using network accessible endpoints, implemented by the computing system of FIG. 1.

FIG. 5 shows an example of ingesting sets of data 30 across multiple data domains of a third-party organization 24. The set of data 30 may be one of a plurality of sets of data 30 across each of the data domains 28 of the third-party organization 24. As shown, the sets of data 30 may include data collected from suites of sensors in the physical world that measure data related to that data domain. For example, one domain may collect sets of data 30 from a suite of sensors in an exploration domain 116. Another domain may collect sets of data 30 from a suite of sensors in a drilling domain 118. Yet another domain may collect sets of data 30 from a suite of sensors in a production domain 120. The types of sensors and types of data measured by those sensors may be difference across the different domains. As a few non-limiting examples, the plurality of sets of data 30 may include data collected by sensors such as wellhead sensors, seismic sensors, tank sensors, rolling stock sensors, pipeline flow sensors, etc. It should be appreciated that these sensors are merely exemplary, and that other suitable types of data may be measured by other suitable types of sensors across any suitable data domain.

As discussed above, typically in a third-party organization, the different sets of data 30 for the different data domains are siloed in separate domain-specific data platforms 26 that have been built over time. Additionally, these sets of data 30 may also be stored with legacy file formats 122 and legacy storage capabilities which may not include modern data management attributes such as search indexing, operability with machine learning models, etc. These aspects may make integration of the different domain-specific data platforms 26 challenging for the third-party organization 24.

As described herein, the computing system 10 may integrate the sets of data 30 from all of the third-party organization's 24 domain-specific platforms 26. Using the data ingestion process described above, the computing system 10 may be configured to ingest the plurality of sets of data 30 using the metadata extraction pipeline 74. By defining the target metadata schema and target domain extension 82, an authorized user of the third-party organization 24 may define how the plurality of sets of data 30 across all of the domain-specific platforms 26 will be ingested and stored on the databases 38 of the computing system 10. Based on the target metadata schema and the target domain extension, the computing system 10 may be configured to store the ingested plurality of sets of data 40 in a new file format 124 that is different than the legacy file format 122. Data for the new file format 124 may require different storage and infrastructure components 44 for the database platform 38 for storing the new file format 122 compared to the legacy file format 122. As a specific example, the new file format 122 may be a relational data file format that requires a relational database for storage. As another example, the new file format 122 may be a time-series data format that requires a database configured to store time-series data.

The ingested plurality of sets of data 40 are indexed for search, and the new file format 124 may allow modern data management systems and data analytics to be applied to the ingested plurality of sets of data 40. In contrast, the original sets of data 30 may have used a legacy file format 122 that is difficult to integrate with those modern data management and data analytics systems.

The ingested plurality of sets of data 40 may be provided to machine learning models 78. In one example, the machine learning models 78 may be platform models that are executed on the computing system 10. In another example, the machine learning models 78 may be third-party machine learning models, such as machine learning models run by the third-party organization 24, and the computing system 10 may be configured to provide the ingested plurality of sets of data to the machine learning model using a network accessible endpoint 126. In contrast to the sets of data 30 stored on the domain-specific data platforms 26 with the legacy file format 122, the ingested plurality of sets of data 40 are stored in a new file format 124, and have properties such as being indexed for searchability, standardized fields between sets of data, and other attributes that provide the potential benefits to operating on the ingested data using machine learning models 78.

The machine learning models 78 may be provided with more than one of the ingested sets of data 40, and may be configured to extract combined learnings 128 from the more than one ingested sets of data 40. Thus, the machine learning models 78 may process data from across multiple data domains, such as the exploration domain, drilling domain, and production domain managed by the third-party organization to generate new insights across all of the data. Additionally, the computing system 10 may store other data 130 that may be leveraged by clients, such as, for example, weather data, event data, etc. The machine learning models 78 may be configured to process the other data 130 in addition to the ingested plurality of sets of data 40 to extract the combined learnings 128. The combined learnings 128 may also be stored on the databases 38, and accessed by the authorized user of the third-party organization 24. The authorized user or an application program 60 run on a client computing device 58 associated with the authorized user may access the ingested plurality of sets of data 40 and the combined learnings 128 via the network accessible endpoint 126 provided by the computing system 10.

Figure 6:
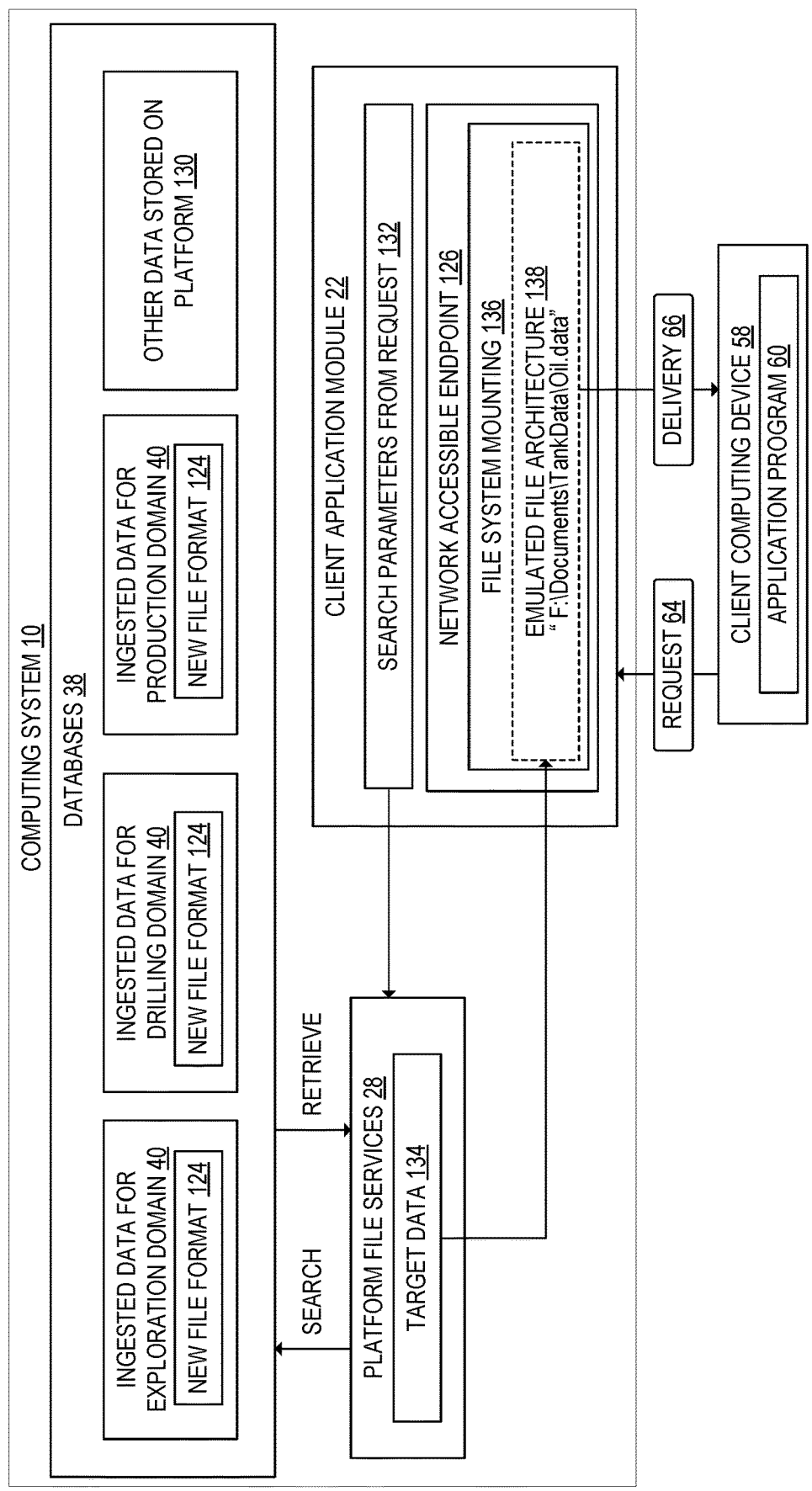
FIG. 6 shows an example of providing access to target data stored on a database using a network accessible endpoint that provide file system mounting capabilities, implemented by the computing system of FIG. 1.

FIG. 6 illustrates an example of providing data stored on the databases 38 to application programs 60 run on client computing devices 58 via the network accessible endpoints 126. As shown, the client application module 22 may receive requests 64 from the application program 60. The requests 64 may include search parameters 132 for target data 134 that is stored on the databases 38 as part of the ingested plurality of sets of data 40. For example, the search parameters 132 may take the form of "Drilling data from December $10^{th}$ to December $18^{th}$". The client application module 22 may be configured to work in concert with the platform file services 28 to search the databases 38 for the target data 134 based on the search parameters 132. As discussed above, the ingested plurality of sets of data 40 are indexed for searchability. The platform file services 28 may retrieve the target data 134 from the databases 38. The client application module 22 may be configured to allocate a network accessible endpoint 126 to the application program 60 to access the target data 134, and read, write, or otherwise manipulate the target data 134.

In one example, the application program 60 or an authorized user of the application program 60 may instruct the client application module 22 to mount the target data 134 to a specific file system architecture suitable for the application program 60. For example, the application program 60 may be a legacy application program that is hard-coded to read and write to a data file specifically named Oil.data at the specific file path "F:\Documents\TankData\Oil.data". The network accessible endpoint 126 may be configured to perform file system mounting 136 to mount the target data 134 to the specified architecture and file path. In one example, the network accessible endpoint 126 may include emulated file architecture 138 that emulate the specified file system architecture and file path expected by the application program 60. In the specific example of FIG. 6, the target data 134 may be included in the Oil.data file at the emulated file location of "F:\Documents\TankData\Oil.data". The target data 134 may be delivered to the application program 60 from the network accessible endpoint 126. Any changes to the target data 134 may also be propagated back to the databases 38 of the computing system 10.

Figure 7:
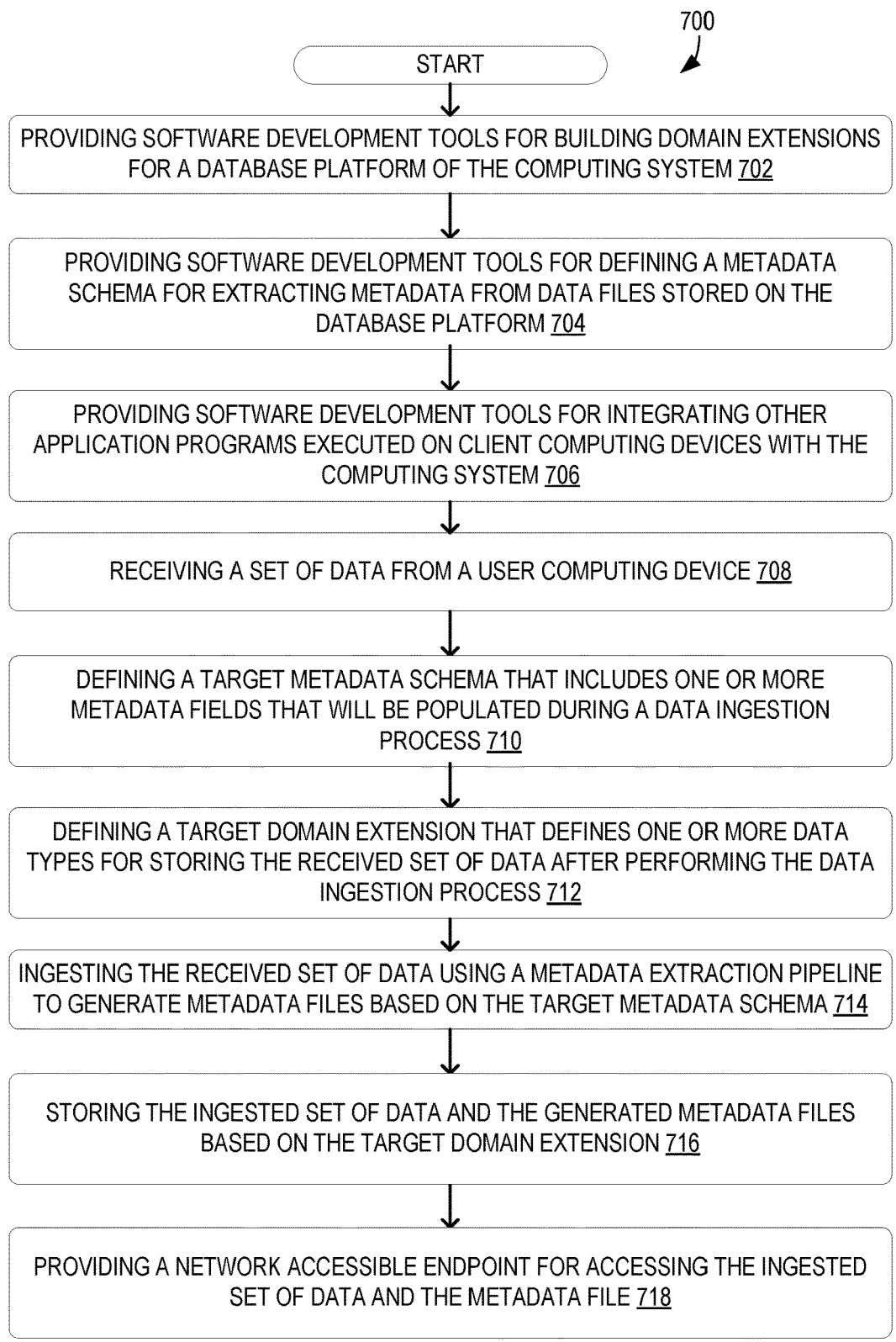
FIG. 7 shows a flowchart of an example method for integrating domain-specific data platforms for third-party organizations, according to one embodiment of the subject disclosure.

FIG. 7 shows a flowchart for an example method 700 for integrating the data and functionality of various domain-specific platforms used by the third-party organization. The method 700 may be performed by one or more processors of a computing system, such as the computing system 10 of FIG. 1.

At 702, the method 700 may include providing software development tools for building domain extensions for a database platform of the computing system. The domain extensions include defining a data type for data to be stored on the database platform, and storage and infrastructure components for the database platform for storing that defined data type. As a specific example, a domain extension may define a relational data type, and may include storage and infrastructure components for a relational database to store the relational data type.

At 704, the method 700 may include providing software development tools for defining a metadata schema for extracting metadata from data files stored on the database platform, and generating a metadata extraction pipeline to extract metadata based on the defined metadata schema. The software development tools may include a GUI interface for receiving user input to define the metadata schema.

At 706, the method 700 may include providing software development tools for integrating other application programs executed on client computing devices with the computing system. The software development tools may include a GUI interface for receiving user input of settings for integrating with the application programs. For example, the application programs may be legacy applications that are hard-coded to read/write to a specific data file in a particular file architecture. The software development kit may include tools for mounting data to the particular file architecture expected by the application programs.

At 708, the method 700 may include receiving a set of data from a user computing device. The set of data may include unstructured documents, raster images, and other types of data. The set of data may be in a legacy file format.

At 710, the method 700 may include defining a target metadata schema that includes one or more metadata fields that will be populated during a data ingestion process. In one example, defining the target metadata schema may include classifying the received set of data to determine a file format for the received set of data, and defining the target metadata schema based on the determined file format for the received set of data. As a specific example, a "drilling data" file format may be associated with an OSDU drilling data schema, or another default or basic schema for drilling data.

In another example, defining the target metadata schema may include identifying a plurality of types of metadata that can be extracted from the received set of data, presenting a list of the plurality of types of metadata to a user, receiving user input of one or more user selected types of metadata, and defining the target metadata schema based on the one or more user selected types of metadata. One example process for creating a metadata schema described above with reference to FIG. 4. In another example, defining the target metadata schema may include receiving a new target metadata schema from a user.

At 712, the method 700 may include defining a target domain extension that defines one or more data types for storing the received set of data after performing the data ingestion process. The target domain extension may indicate how the set of data will be stored on the backend database after ingestion. For example, the set of data may be ingested and stored as time-series data.

At 714, the method 700 may include ingesting the received set of data using a metadata extraction pipeline to generate metadata files based on the target metadata schema. An example metadata extraction pipeline is described above with reference to FIG. 3. At 716, the method 700 may include storing the ingested set of data and the generated metadata files based on the target domain extension. The ingested set of data may have a different file format than the originally received set of set. For example, the ingested set of data may take the form of relational data that is stored in a relational database. The ingested data may be indexed for searchability, and the file format may be operable by machine learning models to generate new learnings from the ingested data.

At method 718, the method 700 may include providing a network accessible endpoint for accessing the ingested set of data and the metadata file. In one example, the method may include receiving requests from an integrated application program to retrieve target data stored on the database platform, retrieving the target data from the database platform, and providing the integrated application program with a network accessible endpoint to retrieve the target data.

In one example, the requests received from the integrated application program may further include a target file system for receiving the target data. In this example, the method may include retrieving the target data from the database platform, mounting the target data to the target file system, and providing the integrated application program with the network accessible endpoint to retrieve the target data mounted to the target file system. Mounting the target data to the target file system may include emulating a file architecture of the target file system at the network accessible endpoint, the emulated file architecture including a target file path, and providing the target data to the integrated application program using the emulated file architecture.

The computing system and methods described herein provide the potential benefit of addressing challenges in integrating different data platforms across different data domains in the subsurface and energy data platform industry. Integration of these data platforms has become increasingly valuable for businesses in the data industry due to data driven regulation and auditing, as well as end-to-end business optimization. The computing system and methods described herein address these challenges by providing a data platform that is built with an extensibility framework that includes extensible functionality at several different layers. The platform provides SDKs that include training and services/tools to simplify the building of these extensible components and functionality.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
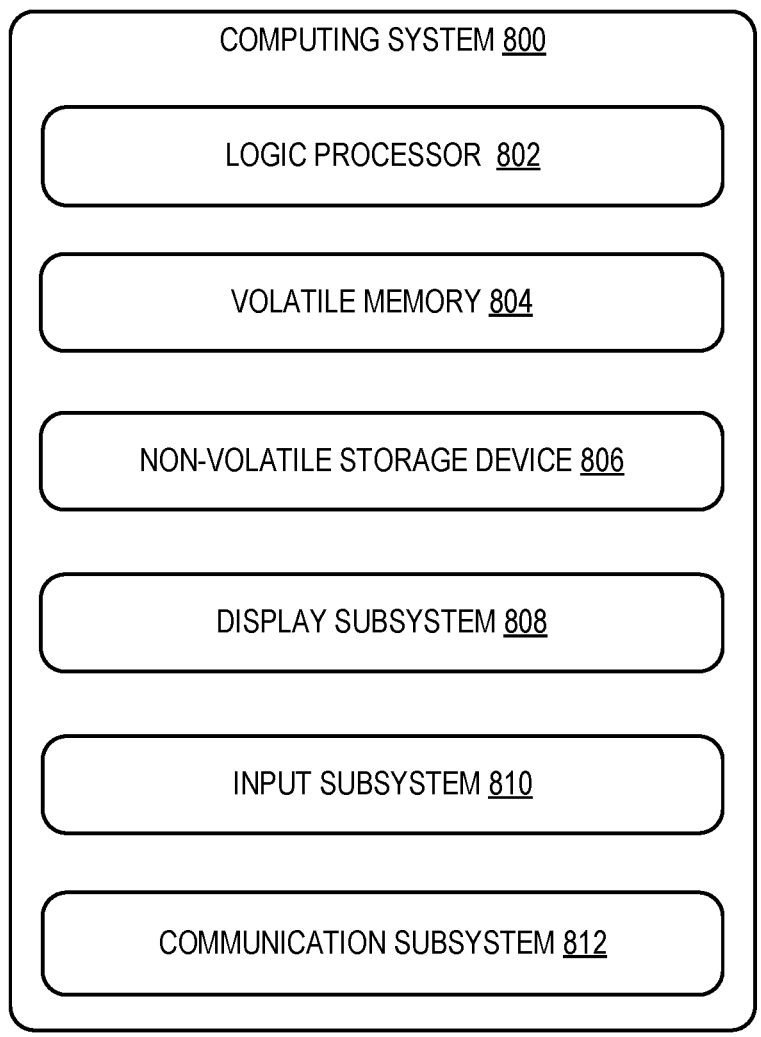
FIG. 8 shows a schematic view of an example computing environment in which the computing system of FIG. 1 may be enacted.

FIG. 8 schematically shows a non-limiting embodiment of a computing system 800 that can enact one or more of the methods and processes described above. Computing system 800 is shown in simplified form. Computing system 800 may embody the computer device 10 described above and illustrated in FIG. 2. Computing system 800 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 800 includes a logic processor 802 volatile memory 804, and a non-volatile storage device 806. Computing system 800 may optionally include a display subsystem 808, input subsystem 810, communication subsystem 812, and/or other components not shown in FIG. 8.

Logic processor 802 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 802 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 806 includes one or more physical devices configured to hold instructions executable by the logic processors to implement the methods and processes described herein. When such methods and processes are implemented, the state of non-volatile storage device 806 may be transformed—e.g., to hold different data.

Non-volatile storage device 806 may include physical devices that are removable and/or built-in. Non-volatile storage device 806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 806 may include non-volatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806.

Volatile memory 804 may include physical devices that include random access memory. Volatile memory 804 is typically utilized by logic processor 802 to temporarily store information during processing of software instructions. It will be appreciated that volatile memory 804 typically does not continue to store instructions when power is cut to the volatile memory 804.

Aspects of logic processor 802, volatile memory 804, and non-volatile storage device 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 typically implemented in software by a processor to perform a particular function using portions of volatile memory, which function involves transformative processing that specially configures the processor to perform the function. Thus, a module, program, or engine may be instantiated via logic processor 802 executing instructions held by non-volatile storage device 806, using portions of volatile memory 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 808 may be used to present a visual representation of data held by non-volatile storage device 806. The visual representation may take the form of a graphical user interface (GUI). As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology. Such display devices may be combined with logic processor 802, volatile memory 804, and/or non-volatile storage device 806 in a shared enclosure, or such display devices may be peripheral display devices.

When included, input subsystem 810 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 800 to send and/or receive messages to and/or from other devices via a network such as the Internet.

The following paragraphs provide additional support for the claims of the subject application. One aspect provides a computing system comprising one or more server computing devices including one or more processors configured to execute instructions for a domain extensibility module that provides software development tools for building domain extensions for a database platform of the computing system. The domain extensions define a data type for data to be stored on the database platform, and storage and infrastructure components for the database platform for storing that defined data type. The one or more processors are configured to execution instructions for a data ingestion module that provides software development tools for defining a metadata schema for extracting metadata from data files stored on the database platform, and generating a metadata extraction pipeline to extract metadata based on the defined metadata schema. The one or more processors are configured to receive a set of data from a user computing device, define a target metadata schema that includes one or more metadata fields that will be populated during a data ingestion process, define a target domain extension that defines one or more data types for storing the received set of data after performing the data ingestion process, ingest the received set of data using a metadata extraction pipeline to generate metadata files based on the target metadata schema, store the ingested set of data and the generated metadata files based on the target domain extension, and provide a network accessible endpoint for accessing the ingested set of data and the metadata file.

In this aspect, additionally or alternatively, to define the target metadata schema, the one or more processors may be configured to classify the received set of data to determine a file format for the received set of data, and define the target metadata schema based on the determined file format for the received set of data. In this aspect, additionally or alternatively, to define the target metadata schema, the one or more processors may be configured to identify a plurality of types of metadata that can be extracted from the received set of data, present a list of the plurality of types of metadata to a user, receive user input of one or more user selected types of metadata, and define the target metadata schema based on the one or more user selected types of metadata. In this aspect, additionally or alternatively, to define the target metadata schema, the one or more processors may be configured to receive a new target metadata schema from a user.

In this aspect, additionally or alternatively, the one or more processors may be configured to execute instructions for a client application module that provides software development tools for integrating other application programs executed on client computing devices with the computing system. In this aspect, additionally or alternatively, the one or more processors may be configured to receive requests from an integrated application program to retrieve target data stored on the database platform, retrieve the target data from the database platform, and provide the integrated application program with a network accessible endpoint to retrieve the target data. In this aspect, additionally or alternatively, to retrieve the target data form the database platform, the one or more processors may be configured to receive a search parameter for the target data with the received request from the integrated application program, and search the ingested set of data and the stored metadata files based on the received search parameter to identify the target data. In this aspect, additionally or alternatively, the requests received from the integrated application program may further include a target file system for receiving the target data, and wherein the one or more processors may be further configured to retrieve the target data from the database platform, mount the target data to the target file system, and provide the integrated application program with the network accessible endpoint to retrieve the target data mounted to the target file system. In this aspect, additionally or alternatively, to mount the target data to the target file system, the one or more processors may be further configured to emulate a file architecture of the target file system at the network accessible endpoint, the emulated file architecture including a target file path, and provide the target data to the integrated application program using the emulated file architecture.

In this aspect, additionally or alternatively, the one or more processors may be configured to execute instructions for a machine learning model module that provides software development tools for integrating one or more third party machine learning models executed by other computing devices with the computing system. In this aspect, additionally or alternatively, the received set of data may be one of a plurality of sets of data, each set of data having a legacy file format. Each set of data of the plurality of sets of data may be received from different respective domain-specific data platforms. Each domain-specific data platform may be configured to aggregate data detected by sensors operating in a domain associated with that domain-specific data platform. The one or more processors may be further configured to ingest the plurality of sets of data using the metadata extraction pipeline, store the ingested plurality of sets of data in a new file format that is different than the legacy file format and requires different storage and infrastructure components for the database platform for storing the new file format, the ingested plurality of sets of data being indexed for search, provide a network accessible endpoint for accessing the ingested plurality of sets of data, and provide the ingested plurality of sets of data to a machine learning model using the network accessible endpoint. In this aspect, additionally or alternatively, the plurality of sets of data may include data collected by sensors selected from the group consisting of wellhead sensors, seismic sensors, tank sensors, rolling stock sensors, and pipeline flow sensors.

Another aspect provides a method comprising, at one or more processors of a computing system, providing software development tools for building domain extensions for a database platform of the computing system, wherein the domain extensions include defining a data type for data to be stored on the database platform, and storage and infrastructure components for the database platform for storing that defined data type, and providing software development tools for defining a metadata schema for extracting metadata from data files stored on the database platform, and generating a metadata extraction pipeline to extract metadata based on the defined metadata schema. The method further comprises receiving a set of data from a user computing device, defining a target metadata schema that includes one or more metadata fields that will be populated during a data ingestion process, defining a target domain extension that defines one or more data types for storing the received set of data after performing the data ingestion process, ingesting the received set of data using a metadata extraction pipeline to generate metadata files based on the target metadata schema, storing the ingested set of data and the generated metadata files based on the target domain extension, and providing a network accessible endpoint for accessing the ingested set of data and the metadata file.

In this aspect, additionally or alternatively, defining the target metadata schema may further comprise classifying the received set of data to determine a file format for the received set of data, and defining the target metadata schema based on the determined file format for the received set of data. In this aspect, additionally or alternatively, defining the target metadata schema may further comprise identifying a plurality of types of metadata that can be extracted from the received set of data, presenting a list of the plurality of types of metadata to a user, receiving user input of one or more user selected types of metadata, and defining the target metadata schema based on the one or more user selected types of metadata. In this aspect, additionally or alternatively, defining the target metadata schema may further comprise receiving a new target metadata schema from a user.

In this aspect, additionally or alternatively, the method may further comprise providing software development tools for integrating other application programs executed on client computing devices with the computing system, receiving requests from an integrated application program to retrieve target data stored on the database platform, retrieving the target data from the database platform, and providing the integrated application program with a network accessible endpoint to retrieve the target data. In this aspect, additionally or alternatively, the requests received from the integrated application program may further include a target file system for receiving the target data, and the method may further comprise retrieving the target data from the database platform, mounting the target data to the target file system, and providing the integrated application program with the network accessible endpoint to retrieve the target data mounted to the target file system. In this aspect, additionally or alternatively, mounting the target data to the target file system may further comprise emulating a file architecture of the target file system at the network accessible endpoint, the emulated file architecture including a target file path, and providing the target data to the integrated application program using the emulated file architecture.

Another aspect provides a computing system comprising one or more server computing devices including one or more processors configured to execute instructions for a domain extensibility module that provides software development tools for building domain extensions for a database platform of the computing system. The domain extensions define a data type for data to be stored on the database platform, and storage and infrastructure components for the database platform for storing that defined data type. The one or more processors are configured to execute instructions for a data ingestion module that provides software development tools for defining a metadata schema for extracting metadata from data files stored on the database platform, and generating a metadata extraction pipeline to extract metadata based on the defined metadata schema. The one or more processors are configured to receive a plurality of sets of data from different respective domain-specific data platforms, each domain-specific data platform being configured to aggregate data detected by sensors operating in a domain associated with that domain-specific data platform, wherein the sets of data of the plurality of sets of data have a legacy file format. The one or more processor are configured to define one or more target metadata schema for the plurality of sets of data, each target metadata schema including one or more metadata fields that will be populated during a data ingestion process, and define a target domain extension that defines one or more new file formats for storing the received plurality of sets of data after performing the data ingestion process. The one or more new file formats are different than the legacy file format and require different storage and infrastructure components for the database platform for storing the one or more new file formats. The one or more processors are configured to ingest the plurality of sets of data using a metadata extraction pipeline to generate metadata files based on the target metadata schema, store the ingested plurality of sets of data and the generated metadata files using the defined one or more new file formats, the ingested plurality of sets of data being indexed for search, and provide a network accessible endpoint for accessing the ingested plurality of sets of data and the metadata file.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
one or more server computing devices including one or more processors configured to execute instructions for:
a domain extensibility module that provides software development tools for building domain extensions for a database platform of the computing system, wherein the domain extensions define a data type for data to be stored on the database platform, and storage and infrastructure components for the database platform for storing that defined data type; and
a data ingestion module that provides software development tools for defining a metadata schema for extracting metadata from data files stored on the database platform, and generating a metadata extraction pipeline to extract metadata based on the defined metadata schema;
wherein the one or more processors are configured to:
receive a set of data from a domain-specific data platform, the domain-specific data platform being configured to aggregate data detected by one or more sensors operating in a domain associated with the domain-specific data platform;
define a target metadata schema that includes one or more metadata fields that will be populated during a data ingestion process;
define a target domain extension that defines one or more data types for storing the received set of data after performing the data ingestion process;
ingest the received set of data using a metadata extraction pipeline to generate metadata files based on the target metadata schema;
store the ingested set of data and the generated metadata files based on the target domain extension; and
provide a network accessible endpoint for accessing the ingested set of data and the metadata file.

2. The computing system of claim 1, wherein to define the target metadata schema, the one or more processors are configured to:
classify the received set of data to determine a file format for the received set of data; and
define the target metadata schema based on the determined file format for the received set of data.

3. The computing system of claim 2, wherein to define the target metadata schema, the one or more processors are further configured to:
identify a plurality of types of metadata that can be extracted from the received set of data;
present a list of the plurality of types of metadata to a user;
receive user input of one or more user selected types of metadata; and
define the target metadata schema based on the one or more user selected types of metadata.

4. The computing system of claim 1, wherein to define the target metadata schema, the one or more processors are configured to receive a new target metadata schema from a user.

5. The computing system of claim 1, wherein the one or more processors are configured to execute instructions for a client application module that provides software development tools for integrating other application programs executed on client computing devices with the computing system.

6. The computing system of claim 5, wherein the one or more processors are configured to:
receive requests from an integrated application program to retrieve target data stored on the database platform;
retrieve the target data from the database platform; and
provide the integrated application program with a network accessible endpoint to retrieve the target data.

7. The computing system of claim 6, wherein to retrieve the target data form the database platform, the one or more processors are configured to:
receive a search parameter for the target data with the received request from the integrated application program; and
search the ingested set of data and the stored metadata files based on the received search parameter to identify the target data.

8. The computing system of claim 6, wherein the requests received from the integrated application program further include a target file system for receiving the target data, and wherein the one or more processors are further configured to:
retrieve the target data from the database platform;
mount the target data to the target file system; and
provide the integrated application program with the network accessible endpoint to retrieve the target data mounted to the target file system.

9. The computing system of claim 8, wherein to mount the target data to the target file system, the one or more processors are further configured to:
emulate a file architecture of the target file system at the network accessible endpoint, the emulated file architecture including a target file path; and
provide the target data to the integrated application program using the emulated file architecture.

10. The computing system of claim 1, wherein the one or more processors are configured to execute instructions for a machine learning model module that provides software development tools for integrating one or more third party machine learning models executed by other computing devices with the computing system.

11. The computing system of claim 10, wherein the received set of data is one of a plurality of sets of data, each set of data having a legacy file format, wherein each set of data of the plurality of sets of data are received from different respective domain-specific data platforms, each domain-specific data platform being configured to aggregate data detected by sensors operating in a domain associated with that domain-specific data platform, and wherein the one or more processors are further configured to:
ingest the plurality of sets of data using the metadata extraction pipeline;
store the ingested plurality of sets of data in a new file format that is different than the legacy file format and requires different storage and infrastructure components for the database platform for storing the new file format, the ingested plurality of sets of data being indexed for search;
provide a network accessible endpoint for accessing the ingested plurality of sets of data; and
provide the ingested plurality of sets of data to the one or more machine learning models using the network accessible endpoint.

12. The computing system of claim 11, wherein the plurality of sets of data include data collected by sensors selected from the group consisting of wellhead sensors, seismic sensors, tank sensors, rolling stock sensors, and pipeline flow sensors.

13. A method comprising:
at one or more processors of a computing system:
providing software development tools for building domain extensions for a database platform of the computing system, wherein the domain extensions include defining a data type for data to be stored on the database platform, and storage and infrastructure components for the database platform for storing that defined data type;
providing software development tools for defining a metadata schema for extracting metadata from data files stored on the database platform, and generating a metadata extraction pipeline to extract metadata based on the defined metadata schema;
receiving a set of data from a domain-specific data platform, the domain-specific data platform being configured to aggregate data detected by one or more sensors operating in a domain associated with the domain-specific data platform;
defining a target metadata schema that includes one or more metadata fields that will be populated during a data ingestion process;
defining a target domain extension that defines one or more data types for storing the received set of data after performing the data ingestion process;
ingesting the received set of data using a metadata extraction pipeline to generate metadata files based on the target metadata schema;
storing the ingested set of data and the generated metadata files based on the target domain extension; and
providing a network accessible endpoint for accessing the ingested set of data and the metadata file.

14. The method of claim 13, wherein defining the target metadata schema further comprises:
classifying the received set of data to determine a file format for the received set of data; and
defining the target metadata schema based on the determined file format for the received set of data.

15. The method of claim 14, wherein defining the target metadata schema further comprises:

identifying a plurality of types of metadata that can be extracted from the received set of data;
presenting a list of the plurality of types of metadata to a user;
receiving user input of one or more user selected types of metadata; and
defining the target metadata schema based on the one or more user selected types of metadata.

16. The method of claim 13, wherein defining the target metadata schema further comprises receiving a new target metadata schema from a user.

17. The method of claim 13, further comprising:
providing software development tools for integrating other application programs executed on client computing devices with the computing system;
receiving requests from an integrated application program to retrieve target data stored on the database platform;
retrieving the target data from the database platform; and
providing the integrated application program with a network accessible endpoint to retrieve the target data.

18. The method of claim 17, wherein the requests received from the integrated application program further include a target file system for receiving the target data, and wherein the method further comprises:
retrieving the target data from the database platform;
mounting the target data to the target file system; and
providing the integrated application program with the network accessible endpoint to retrieve the target data mounted to the target file system.

19. The method of claim 18, wherein mounting the target data to the target file system further comprises:
emulating a file architecture of the target file system at the network accessible endpoint, the emulated file architecture including a target file path; and
providing the target data to the integrated application program using the emulated file architecture.

20. A computing system comprising:
one or more server computing devices including one or more processors configured to execute instructions for:
a domain extensibility module that provides software development tools for building domain extensions for a database platform of the computing system, wherein the domain extensions define a data type for data to be stored on the database platform, and storage and infrastructure components for the database platform for storing that defined data type;
a data ingestion module that provides software development tools for defining a metadata schema for extracting metadata from data files stored on the database platform, and generating a metadata extraction pipeline to extract metadata based on the defined metadata schema;
wherein the one or more processors are configured to:
receive a plurality of sets of data from different respective domain-specific data platforms, each domain-specific data platform being configured to aggregate data detected by sensors operating in a domain associated with that domain-specific data platform, wherein the sets of data of the plurality of sets of data have a legacy file format;
define one or more target metadata schema for the plurality of sets of data, each target metadata schema including one or more metadata fields that will be populated during a data ingestion process;
define a target domain extension that defines one or more new file formats for storing the received plurality of sets of data after performing the data ingestion process, wherein the one or more new file formats are different than the legacy file format and require different storage and infrastructure components for the database platform for storing the one or more new file formats;

ingest the plurality of sets of data using a metadata extraction pipeline to generate metadata files based on the target metadata schema;

store the ingested plurality of sets of data and the generated metadata files using the defined one or more new file formats, the ingested plurality of sets of data being indexed for search; and provide a network accessible endpoint for accessing the ingested plurality of sets of data and the metadata file.

* * * * *